US012563104B2

(12) United States Patent
    Qiu et al.

(10) Patent No.: US 12,563,104 B2
(45) Date of Patent: Feb. 24, 2026

(54) MULTI-STAGE SECURITY RULESET FILTERING TO REDUCE ATTACK COVERAGE REDUNDANCY

(71) Applicant: Palo Alto Networks, Inc., Santa Clara, CA (US)

(72) Inventors: Li Qiu, Milpitas, CA (US); Mengying Jiang, Campbell, CA (US); Lexuan Sun, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 175 days.

(21) Appl. No.: 18/187,561

(22) Filed: Mar. 21, 2023

(65) Prior Publication Data

US 2024/0323234 A1    Sep. 26, 2024

(51) Int. Cl.
    *G06F 21/00*        (2013.01)
    *H04L 9/40*         (2022.01)

(52) U.S. Cl.
    CPC ........ *H04L 63/205* (2013.01); *H04L 63/1425* (2013.01)

(58) Field of Classification Search
    CPC ............... H04L 63/205; H04L 63/1425; H04L 63/0263; H04L 63/20
    See application file for complete search history.

(56) References Cited

U.S. PATENT DOCUMENTS

| | | | | |
|---|---|---|---|---|
| 10,735,469 | B1 * | 8/2020 | Dods ....................... | H04L 63/20 |
| 2015/0373054 | A1 * | 12/2015 | Chapman, II ....... | G06F 21/6218 |
| | | | | 726/1 |

| | | | | |
|---|---|---|---|---|
| 2019/0007454 | A1 * | 1/2019 | Nimmagadda ....... | G06F 21/554 |
| 2019/0141061 | A1 * | 5/2019 | Krishtal ................ | H04L 63/101 |
| 2020/0186569 | A1 * | 6/2020 | Milazzo .................. | H04L 63/08 |
| 2020/0272741 | A1 * | 8/2020 | Bhatia .................... | G06F 40/284 |
| 2022/0103595 | A1 * | 3/2022 | Scherer .............. | H04L 63/0263 |
| 2023/0179572 | A1 * | 6/2023 | Kambi Ravi ....... | H04L 63/0263 |
| | | | | 726/1 |

OTHER PUBLICATIONS

Stakhanova, et al., "Managing intrusion detection rule sets", EUROSEC '10: Proceedings of the Third European Workshop on System Security, Apr. 2010, 7 pages.
Wierzbicki, et al., "CIDSS: Common Intrusion Detection Signatures Standard", [online], [retrieved on Feb. 21, 2023] Retrieved from the Internet: <https://sigtranslator.sourceforge.net/down/CIDSS.pdf>.

* cited by examiner

*Primary Examiner* — Michael M Lee
(74) *Attorney, Agent, or Firm* — Gilliam IP PLLC

(57)            ABSTRACT

A multi-stage, dual-paradigm redundancy filter for security ruleset management as disclosed herein efficiently manages growth of a resident security ruleset—the resident security ruleset being the managed security ruleset. In a first stage, the redundancy filter operates according to a "rule matching" paradigm. In a second stage, the redundancy filter operates according to an "attack coverage matching" paradigm. For the first stage, the redundancy rule filter removes those rules in an input ruleset that have a complete or partial rule match in the resident security ruleset. For the second stage, the redundancy filter removes those of the remaining rules of the first stage filtered, input ruleset that match attack coverage of rules in the resident security ruleset. A security system then updates the resident security ruleset based on the rules remaining after the multi-stage, dual-paradigm filtering.

20 Claims, 4 Drawing Sheets

MULTI-STAGE SECURITY RULESET FILTERING TO REDUCE ATTACK COVERAGE REDUNDANCY

BACKGROUND

The disclosure generally relates to transmission of digital information (e.g., CPC H04L) and managing network security (e.g., CPC subclass H04L 63/20).

Intrusion detection systems use a behavior-based approach and/or a signature-based approach. For the behavior-based approach, a machine learning model is typically employed to detect anomalous behavior of network traffic. For the signature-based approach, rules are typically defined to detect a cyberattack signature. A rule is written with traffic matching criteria defined with various rule components, such as a text pattern and a specified communication or application protocol. Along with increasing variations in cyberattacks, a ruleset for detecting these attacks also increases in number of rules. An intrusion detection system ruleset can easily include several thousand rules. In addition, different signature-based solutions for an intrusion detection system have different rule syntax. Thus, manual ruleset management has been at least partially displaced by automated ruleset management.

BRIEF DESCRIPTION OF THE DRAWINGS

Embodiments of the disclosure may be better understood by referencing the accompanying drawings.

DESCRIPTION

Figure 1:
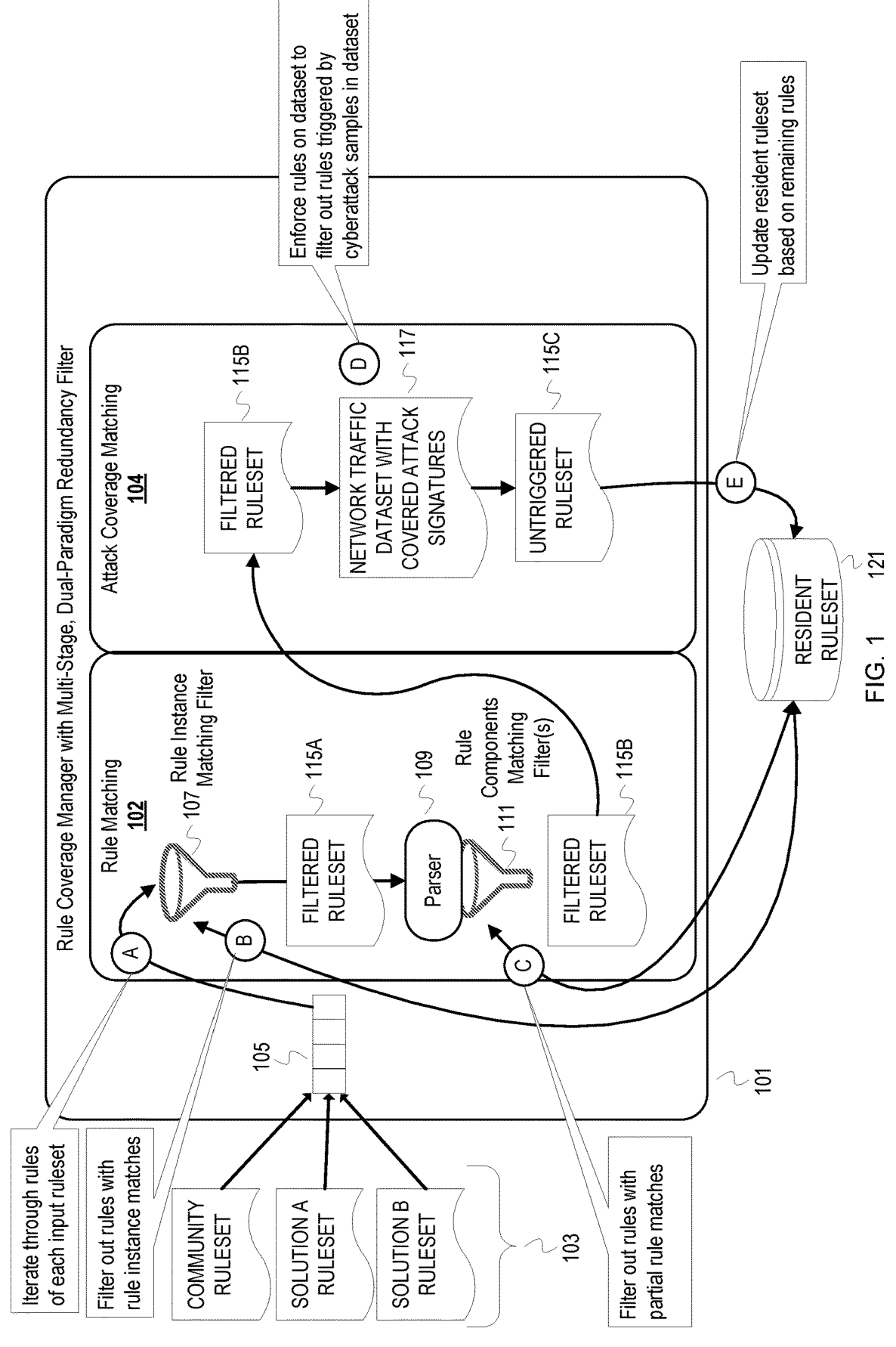
FIG. 1 depicts a rule coverage manager consuming input network security rulesets from different sources and filtering out redundancies with respect to a resident network security ruleset according to a multi-stage, dual-paradigm network security rule redundancy filter.

The description that follows includes example systems, methods, techniques, and program flows to aid in understanding the disclosure and not to limit claim scope. Well-known instruction instances, protocols, structures, and techniques have not been shown in detail for conciseness.

Terminology

This description uses the terms "rule instance" and "rule matching." In this description, rule is often used instead of security rule for brevity. A security rule indicates an action to take when something evaluated against the security rule satisfies a cyberattack signature as indicated in components of the rule. The rule components that collectively indicate a cyberattack signature are sometimes referred to as traffic matching criteria. The term "rule instance" is used herein to refer to a specific expression of a security rule because security rules can be written in different formats and/or with different syntax and still "fire" or be triggered by a same cyberattack instance. In other words, "security rule" or "rule" may be construed as categorical terms. In addition, different security rules may be written with different traffic matching criteria to detect a same cyberattack. The term "rule matching" is used herein as a general term to encompass different types or degrees of matching a rule, which can be a "complete" match of a rule instance (i.e., matching a security rule as written) or a partial match (i.e., matching a value(s) of one or more rule components).

Use of the phrase "at least one of" preceding a list with the conjunction "and" does not limit the list as an exclusive list and is not characterizing the list as a list of categories with one item from each category, unless specifically stated otherwise. A clause that recites "at least one of A, B, and C" can be infringed with only one of the listed items, multiple of the listed items, and one or more of the items in the list and another item not listed.

Overview

Migrating a security system (e.g., an intrusion detection/prevention system) between different security ruleset-based solutions and/or maintaining a security ruleset typically relies on manual redundancy checks to avoid the impacts of a ruleset bloating with redundant rules. Enforcing a bloated ruleset containing redundant rules wastes resources, which especially impacts performance of a resource constrained device (e.g., a firewall device with limited memory). An automated ruleset manager may filter out redundant rules with Common Vulnerability Enumerator (CVE) matching, but a small proportion of a ruleset, in some cases less than 20% of a ruleset, specify CVEs.

A multi-stage, dual-paradigm redundancy filter for security ruleset management as disclosed herein efficiently manages growth of a resident security ruleset—the resident security ruleset being the managed security ruleset (e.g., being enforced by an intrusion detection/prevention system). In a first stage, the redundancy filter operates according to a "rule matching" paradigm. In a second stage, the redundancy filter operates according to an "attack coverage matching" paradigm. For the rule matching paradigm of filtering, the redundancy rule filter removes those rules in an input ruleset that have a complete or partial rule match in the resident security ruleset. For the attack coverage matching paradigm of filtering, the redundancy filter removes those of the remaining rules of the input ruleset that match attack coverage of rules in the resident security ruleset by enforcing the remaining rules on a network traffic dataset that includes cyberattack samples detected by the resident network security ruleset. A security system then updates the resident security ruleset based on the rules remaining after the multi-stage, dual-paradigm filtering.

Example Illustrations

FIG. 1 depicts a rule coverage manager consuming input network security rulesets from different sources and filtering out redundancies with respect to a resident network security ruleset according to a multi-stage, dual-paradigm network security rule redundancy filter. A rule coverage manager 101 is a component of a security system. The security system may be an intrusion detection system, intrusion prevention system, or combined intrusion detection and prevention system. The rule coverage manager 101 includes a rule matching component 102 that is run in a first stage and an attack coverage matching component 104 that is run in a second stage. The rule coverage manager 101 is depicted as consuming input rulesets 103 from different sources: a community sourced ruleset, a solution A ruleset, and a solution B ruleset. The rulesets of different solutions may be from different network security solution providers, a government agency and a private enterprise, etc. These may be provided via subscription paradigm and/or retrieval/fetch paradigm. A repository 121 hosts the resident ruleset. The resident ruleset is the ruleset installed or loaded for enforcement by the security system. The coverage manager 101 periodically consumes and/or is prompted to consume one or more rulesets to increase coverage of the resident ruleset.

FIG. 1 is annotated with a series of letters A-E indicating stages of operations. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, the rule coverage manager 101 selects rules of the input rulesets 103 from an input queue 105 for filtering by the rule matching component 102. Embodiments are not limited to storing an input ruleset into a queue. An input queue is used merely for illustrating one implementation for storing rules to be filtered. Processing rules of an input ruleset will vary depending upon implementation. For instance, the rules may be selected individually for filtering according to the rule instance matching paradigm or in parallel. When consuming rulesets from different sources, the rule coverage manager 101 may be configured to prioritize a specified source or source type (e.g., enterprise sourced ruleset being prioritized over a community sourced ruleset).

The rule matching component 102 includes a rule instance matching filter 107, a parser 109, and a rule components matching filter(s) 111. The rulesets consumed by the rule coverage manager 101 may be written according to different syntax. The parser 109 determines the syntax for format of a ruleset prior to filtering by the rule components matching filter(s) 111 and extracts values of rule components accordingly.

At stage B, the rule instance matching filter 107 searches the repository 121 for an instance match of a selected rule of the input rulesets. An instance match can be considered a complete match of the selected rule. A match of an instance of a rule can be a literal match, for example a string match. A match of an instance of a rule can be a match of a compact representation of the rule instance (e.g., a hash value generated from the rule instance). Although depicted and described as searching the repository that hosts the resident ruleset, embodiments may maintain a separate store or cache of compact representations of the security rules in the resident ruleset. If a selected rule has an instance match with a rule in the resident ruleset, then the selected rule is filtered out (e.g., discarded or marked to ignore or no longer considered for updating the resident ruleset). Filtering by the rule instance matching filter 107 yields a filtered ruleset 115A.

At stage C, the rule components matching filter(s) 111 filters the filtered ruleset 115A based on matches of rule components. The rule components filter(s) 111 may be multiple filters that search for matches of different subsets of the rule components. For example, a first rule component matching filter(s) 111 may search the resident ruleset for any rule in the resident ruleset that indicates a same CVE as those indicated in the filtered ruleset 115A. As mentioned, the parser 109 would determine a syntax or format of the filtered ruleset 115A based on the corresponding source and extract the appropriate value of the rule component being applied. Another of the rule component matching filters 111 would then search the repository 121 for any rules that having matching values of a subset of the rule components that correspond to a cyberattack signature (e.g., protocol, content pattern, and flow identifier). Rules in the filtered ruleset 115A with component subset matches in the resident ruleset are filtered out to yield filtered ruleset 115B.

At stage D, the attack coverage matching component 104 filters out those of the filtered ruleset 115B with a same attack coverage as rules in the resident ruleset. This is determined using a dataset 117 which is a network traffic dataset having attack signatures covered by one or more rules in the resident ruleset. The attack coverage matching component 104 enforces the rules in the filtered ruleset 115B on the network traffic dataset 117. Those rules of the filtered ruleset 115B that are triggered or fired are determined to have a same coverage as one or more rules of the resident ruleset and are filtered out, which yields an untriggered ruleset 115C.

At stage E, the rule coverage manager 101 updates the repository 121 based on the remaining rules in the untriggered ruleset 115C. Updating can be inserting the remaining rules into the repository 121 and/or modifying a rule in the resident ruleset.

Figure 2:
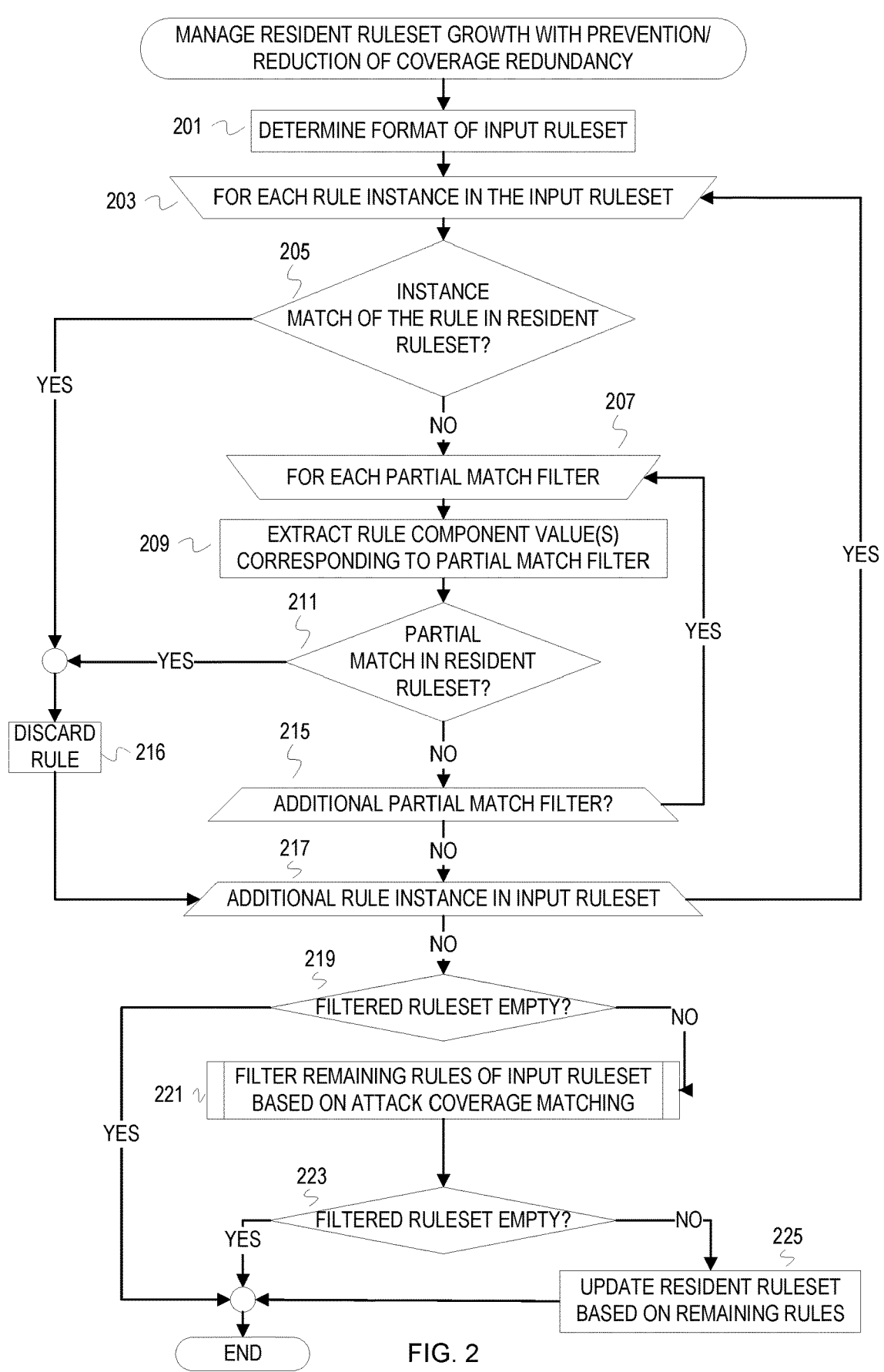
FIG. 2 is a flowchart of example operations for managing resident ruleset growth with prevention or at least reduction of coverage redundancy.
Figure 3:
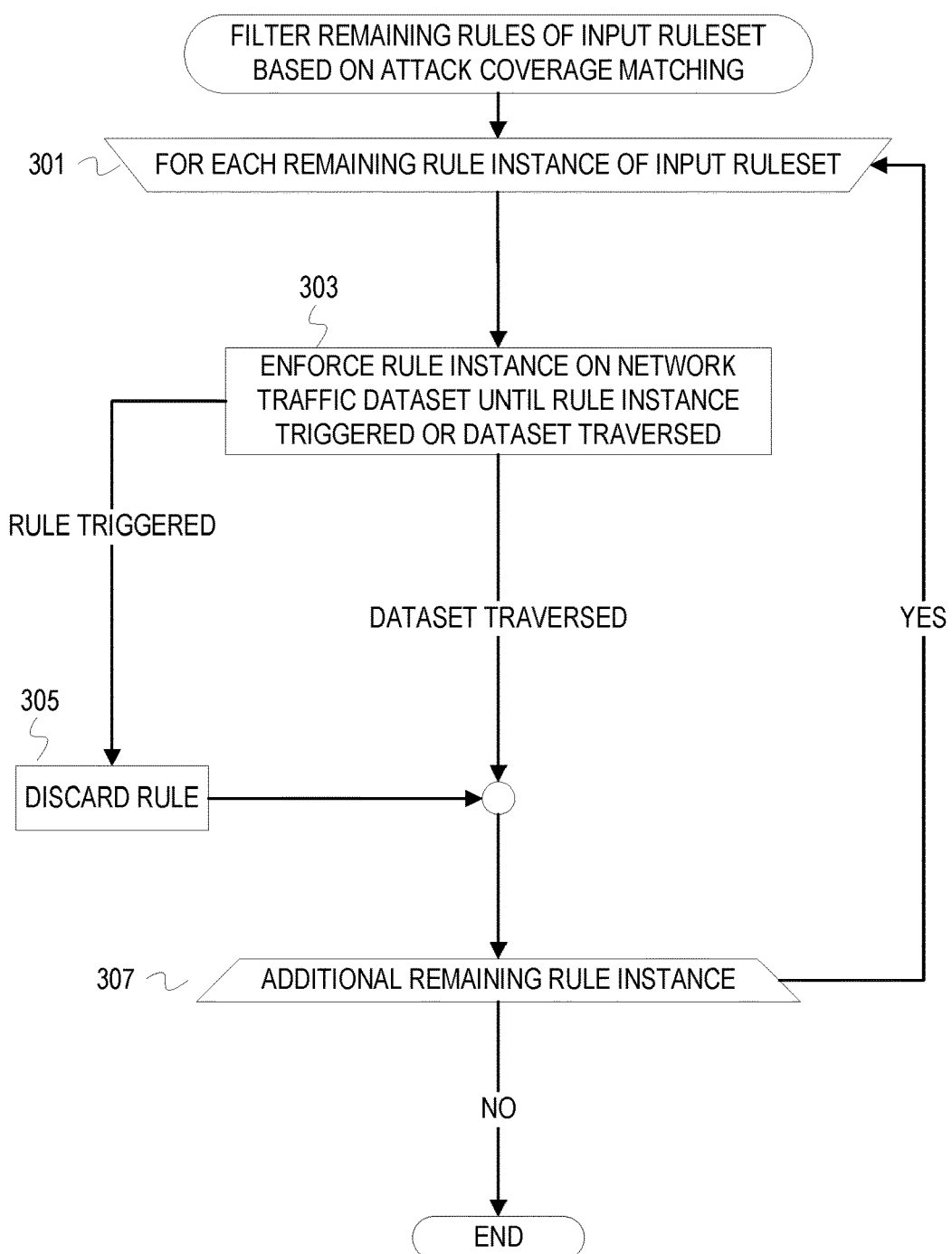
FIG. 3 is a flowchart of example operations for filtering remaining rule instances of the input ruleset based on attack coverage matching.

While FIG. 1 provided a single example illustration, FIGS. 2-3 are flowcharts of operations that provide a more generalized perspective of the disclosed technique for preventing or reducing coverage redundancy of a ruleset. FIGS. 2-3 address processing of a single input ruleset, but the operations would be executed again for another input ruleset. Implementation can process input rulesets from different sources in parallel and reconcile the filtering results prior to updating the resident ruleset.

FIG. 2 is a flowchart of example operations for managing resident ruleset growth with prevention or at least reduction of coverage redundancy. The example operations filter an input security ruleset in multiple stages. A first filtering stage filters out rule instances based on decreasing degrees of matching, which can be considered different degrees of match confidence. Highest match confidence is associated with a complete match, which may be a match of a security rule instance or a match of a hash value of a security rule instance. A partial rule match can also have high match confidence. For instance, a rule instance may include a CVE component. If a security rule instance in a resident ruleset indicates a same CVE value as a rule instance in the input ruleset, then the corresponding attack is already covered by the resident ruleset. Embodiments can filter out rule instances from an input ruleset with various combinations of rule components corresponding to different degrees of match confidence. Embodiment can define a minimum match confidence level allowing for different tradeoffs between managing ruleset growth and decreased accuracy in filtering out coverage redundancy. The second stage of filtering filters out based on attack coverage matching redundancy. After filtering out rule instances that are the same as those in the resident ruleset or indicate a same attack signature as those in the resident ruleset, the second stage expands filtering scope to be filtering out based on coverage without literal matching. This second stage identifies coverage redundancies by identifying those of the input ruleset that trigger or detect the same cyberattacks as the resident ruleset.

While ruleset management can be part of an intrusion detection/prevention system, it is not necessary. Since ruleset management can be part of an intrusion detection/prevention system or an independent component that communicates with an intrusion detection/prevention system, the examples are described as being performed by a ruleset manager, as well as for consistency with FIG. 1.

At block 201, the ruleset manager determines a format of the input ruleset. The format can be determined based on metadata in the input ruleset and/or a source identifier of the input ruleset. The metadata can identify a solution name, community name, rule language, and/or type of the ruleset. Determining the format allows the ruleset manager to parse a rule instance and extract the values of a rule instance corresponding to rule components of a partial match filter. If the resident ruleset is heterogeneous, then the ruleset manager can constrain matching to those rule instances in the resident ruleset having a same format/type.

At block 203, the ruleset manager begins processing each rule instance in the input ruleset. If there are rulesets from different sources and/or of different formats, the ruleset manager traverses the rule instances having a same format before proceeding to a next set or the rulesets of different formats are processed in parallel. This set of example operations processes each rule instance through the rule matching filters until either all rule matching filters have been applied or until a match is found and the rule instance is discarded from consideration for updating the resident ruleset. Embodiments can instead evaluate an input ruleset against the instance matching filter and then proceed to the partial matching filter(s) with those remaining after the instance matching filter.

At block 205, the ruleset manager determines whether the rule instance has an instance match in the resident ruleset. An implementation can search for an instance match based on string matching. An implementation can instead generate a hash value of the rule instance and search a store or cache of hash values generated for the resident ruleset. Implementations can update the cache of resident ruleset hash values whenever the resident ruleset is updated. If cache updates are not paired with updates to the resident ruleset, implementations can use both string matching and hash value matching. If an instance match is found, then the rule instance is discarded at block 216. Otherwise, operational flow proceeds to block 207.

At block 207, the ruleset manager evaluates the ruleset instance with each of the partial match filters until the partial match filters are traversed or the rule instance is discarded. Embodiments can have different numbers of partial match filters. As an example, an embodiment can use vulnerability identifiers (e.g., CVE and bugtraq vulnerability identifiers) for partial matching and rely on the attack coverage matching filter afterwards. Embodiments can allow the first stage of rule matching to be configurable with respect to the partial matching. As an example, a ruleset manager can be implemented to allow a user to select one or more vulnerability identifier filters, a partial match filter with multiple rule components corresponding to an attack signature, and one or more partial match filters with a subset of those rule components all of which do not necessarily correspond to an attack signature. To illustrate, assume a security rule with a format that includes a header and options each of which has multiple components. The rule header components include an action, a communication or application protocol, network address, port(s), and flow. The options components include those corresponding to attack detection (e.g., payload options and non-payload options) and those corresponding to messaging or notifications if an attack is detected. A partial match filter can require all of the rule header components and any of the populated attack detection option components. If an implementation allows, a subsequent partial match filter can be defined that requires a match of rule header components alone. This may lead to slower growth of the resident ruleset at the increased risk of reduced coverage.

At block 209, the ruleset manager extracts rule component value(s) corresponding to the partial match filter. The ruleset manager parses the rule instance based on the determined format (block 201) to extract the value(s).

At block 211, the ruleset manager determines whether a partial match of the rule instance based on the extracted rule component value(s) exists in the resident ruleset. Searching the resident ruleset depends on the storage implementation of the resident ruleset (e.g., SQL database, key-value store, etc.). If the ruleset manager finds a rule instance in the resident ruleset that indicates the same rule component value(s) as extracted from the rule instance of the input ruleset, then the ruleset manager discards the rule instance of the input ruleset at block 216. If the partial match is not found, then operational flow proceeds to block 215.

At block 215, the ruleset manager determines whether there is another partial match filter to apply. If so, then operational flow returns to block 207. If not, then operational flow proceeds to block 217.

At block 217, the ruleset manager determines whether there is another rule instance in the input ruleset to evaluate. If so, then operational flow returns to block 203. If not, then operational flow proceeds to block 219.

At block 219, the ruleset manager determines whether the filtered ruleset is empty. If all the rule instances of the input ruleset have been discarded from the first stage of rule match filtering, then the filtering is completed. If rule instances remain for consideration after the first stage of filtering, then operational flow proceeds to block 221.

At block 221, the ruleset manager filters the remaining rule instances of the input ruleset based on attack coverage matching. FIG. 3 provides a flowchart of example operations for attack coverage matching based filtering of the remaining security rules.

At block 223, the ruleset manager again determines whether the filtered ruleset is empty after the second stage of filtering. If all the rule instances of the input ruleset have been discarded after the second stage of filtering, then there are not updates to make to the resident ruleset and the process ends. If one or more rule instances remain after the second stage of filtering, then operational flow proceeds to block 225.

At block 225, the ruleset manager updates the resident ruleset based on rule instances remaining after the second stage of filtering. Updating the resident ruleset can involve different operations. The rule instances may be inserted into the resident ruleset. However, implementations that maintain a homogenous resident ruleset may convert a remaining rule instance having a different format and/or in a different language and then inserted the converted rule instance. Updating a ruleset also includes modifying a rule instance. For example, a payload options keyword may be added.

FIG. 3 is a flowchart of example operations for filtering remaining rule instances of the input ruleset based on attack coverage matching. As with FIG. 2, the operations refer to a ruleset manager performing the operations.

At block 301, the ruleset manager begins selecting each of the remaining rule instances for evaluation based on attack coverage matching. The ruleset manager applies each of the remaining rule instances to a network traffic dataset. Implementations can alternatively iterate through the cyberattack samples in network traffic dataset and apply the remaining rule instances to each sample as selected.

At block 303, the ruleset manager enforces the rule instance on the network traffic dataset until either the rule instance is triggered or the network traffic dataset has been traversed. The network traffic dataset includes cyberattack samples already covered by the resident ruleset (i.e., trigger at least one of the rule instances in the resident ruleset). The network traffic dataset may be in a pcap file, pcapng file, netflow data, etc. The ruleset manager can stop enforcing the current rule instance when the rule instance is triggered. If triggered, then ruleset manager discards the rule instance at block 305. If the rule instance is never triggered, then the ruleset manager will have traversed the network traffic dataset. After either discarding the rule instance or completing traversal of the network traffic dataset, operational flow proceeds to block 307.

At block 307, the ruleset manager determines whether there is another rule instance remaining. If there is another rule instance remaining, then operational flow returns to block 301. Otherwise, the second stage of filtering has completed and operational flow would proceed to block 223 of FIG. 2.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operation depicted with block 201 may be performed after instance matching and prior to the partial match filters being applied. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
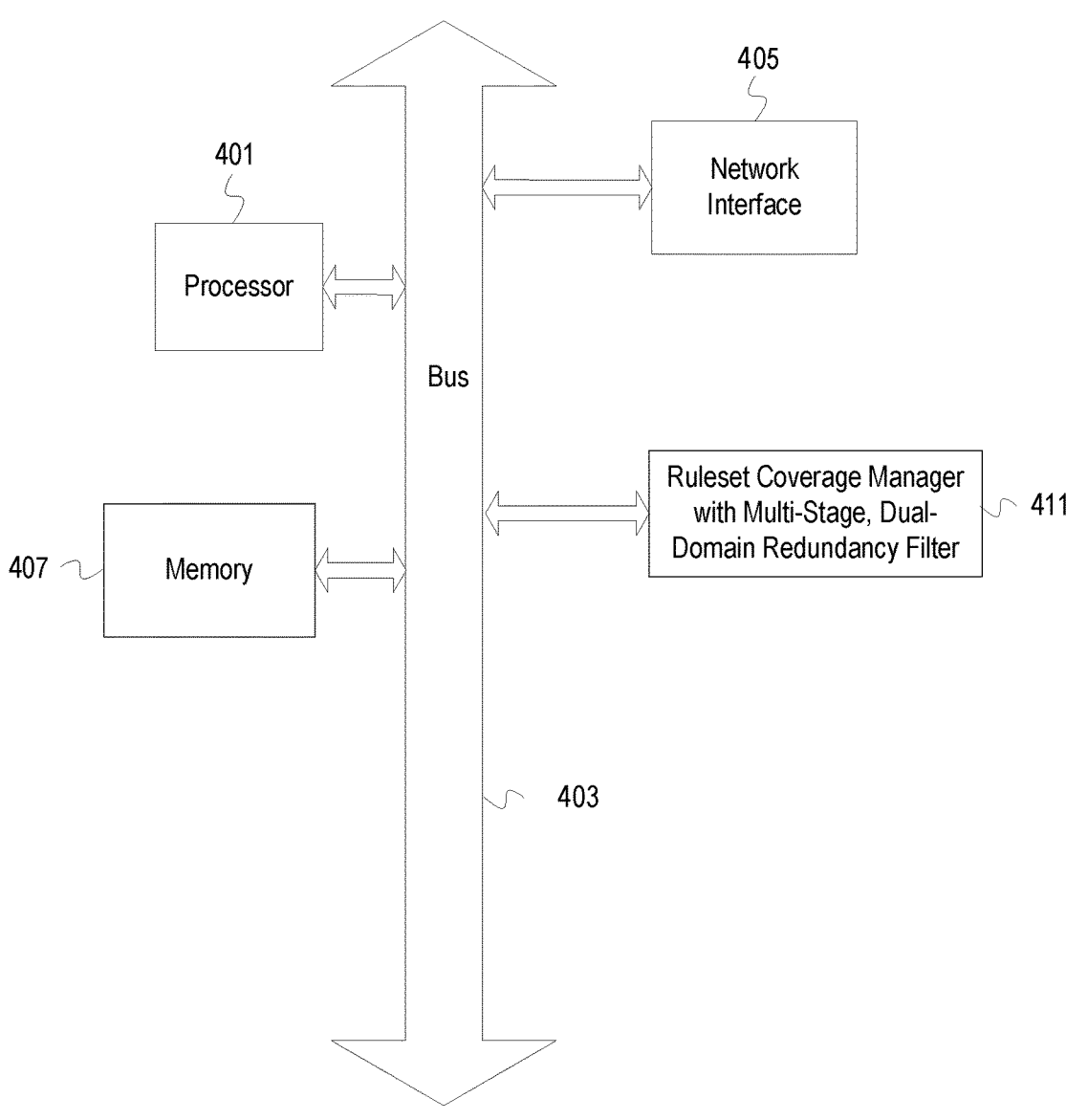
FIG. 4 depicts an example computer system with a ruleset coverage manager.

FIG. 4 depicts an example computer system with a ruleset coverage manager. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes a ruleset coverage manager 411. The ruleset coverage manager 411 filters an input security ruleset prior to updating a resident ruleset to prevent or at least reduce bloating of the resident ruleset with redundant coverage. The ruleset coverage manager 411 uses multi-stage, dual-domain redundancy filtering. The ruleset coverage manager 411 first filters based on different degrees of rule matching based on the rule instances in the input ruleset. Afterwards, the ruleset coverage manager 411 further filters rule instances yielded from the first stage filtering based on attack coverage matching. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

The invention claimed is:

1. A method comprising:
    managing growth of a second plurality of security rules to increase attack coverage without increasing rule redundancy, wherein managing growth comprises,
        filtering a first plurality of security rules based on rule matching against the second plurality of security rules, wherein filtering the first plurality of security rules yields a first subset of the first plurality of security rules that does not have a match in the second plurality of security rules;

filtering the first subset of the first plurality of security rules based on traffic matching, wherein filtering based on traffic matching comprises enforcing the first subset of the first plurality of security rules on a network traffic dataset already covered by at least a subset of the second plurality of security rules, wherein filtering the first subset of the first plurality of security rules yields a second subset of security rules not triggered by the network traffic dataset; and updating the second plurality of security rules to include the second subset of security rules to increase the attack coverage of the second plurality of security rules.

2. The method of claim 1, wherein filtering the first plurality of security rules based on rule matching comprises searching successively according to decreasing degrees of rule matching.

3. The method of claim 2, wherein searching successively according to decreasing degrees of rule matching comprises searching for complete rule matching and then for partial rule matching.

4. The method of claim 1, wherein filtering the first plurality of security rules based on rule matching against the second plurality of security rules comprises filtering based on rule instance matching and rule components matching.

5. The method of claim 4, wherein filtering based on rule instance matching comprises, for each of the first plurality of security rules, searching a repository hosting the second plurality of security rules for one of a literal match with the security rule of the first plurality of security rules and a literal match of a compact representation of the security rule of the first plurality of security rules.

6. The method of claim 4, wherein filtering based on rule components matching comprises searching a repository hosting the second plurality of security rules for different subsets of rule components.

7. The method of claim 6, wherein searching the repository for different subsets of rule components comprises searching, for each of those of the first plurality of security rules not filtered out based on rule instance matching and indicating a vulnerability identifier, a matching vulnerability identifier in the repository and then searching, for each of those of the first plurality of security rules not filtered out by the rule instance matching and the vulnerability identifier matching, the repository for matching rule components corresponding to attack signatures.

8. The method of claim 6, wherein a subset of rule components comprises at least two rule header components, at least two rule options components, or at least one rule header component and at least one rule options component.

9. The method of claim 1, wherein updating the second plurality of security rules to include the second subset of security rules comprises at least one of converting the second subset of security rules to a language of the second plurality of security rules, converting the second subset of security rules to a format of the second plurality of security rules, and modifying at least one of the second plurality of security rules based on a first of the second subset of security rules.

10. One or more non-transitory machine-readable media having program code stored thereon, the program code comprising instructions to:

update coverage of a first security ruleset without introducing coverage redundancy, wherein the instructions to update coverage of the first security ruleset comprise instructions to, determine which security rules in a second security ruleset do not have a complete or partial match in the first security ruleset;

for those of the second security ruleset that do not have a complete or partial match in the first security ruleset, determine which security rules of the second security ruleset are triggered when enforced on cyberattack samples of network traffic that also trigger one or more of the security rules in the first security ruleset; and update the first security ruleset to include those of the second security ruleset that do not have a complete or partial match in the first security ruleset and that are not triggered by the cyberattack samples that trigger the one or more of the security rules in the first security ruleset.

11. The non-transitory machine-readable media of claim 10, wherein the instructions to determine which security rules in the second security ruleset do not have a complete match in the first security ruleset comprise instructions to search a repository hosting the first security ruleset for instance matches or compact representation matches.

12. The non-transitory machine-readable media of claim 10, wherein the instructions to determine which security rules in a second security ruleset do not have a partial match comprise instructions to search a repository hosting the first security ruleset for matches of multiple rule components corresponding to traffic matching criteria.

13. The non-transitory machine-readable media of claim 10, wherein the instructions to determine which security rules in a second security ruleset do not have a complete or partial match in the first security ruleset comprise instructions to successively filter out those security rules of the second security ruleset with a complete match and then those remaining security rules with a partial match.

14. The non-transitory machine-readable media of claim 13, wherein the instructions to filter out those remaining security rules with a partial match after filtering out those of the security rules with a complete match comprise instructions to first filter based on a highest match confidence rule component and then filter based on a combination of rule components that collectively have sufficient match confidence.

15. The non-transitory machine-readable media of claim 10, wherein the instructions to update coverage of a first security ruleset comprise instructions to obtain security rulesets for processing from different sources, wherein the security rulesets include the second security ruleset and the second security ruleset is from one of the different sources.

16. The non-transitory machine-readable media of claim 10, wherein the instructions to update the first security ruleset comprise at least one of instructions to convert those of the second security ruleset not filtered out to a language of the first security ruleset, instructions to convert those of the second security ruleset not filtered out to a format of the first security ruleset, and instructions to modify at least one security rule of the first security ruleset based on a first security rule of those of the second security ruleset not filtered out.

17. An apparatus comprising:

a processor; and a non-transitory machine-readable medium having instructions stored thereon that are executable by the processor to cause the apparatus to, manage growth of a resident security ruleset to increase attack coverage without increasing rule redundancy, wherein the instructions to manage growth comprise instructions to, in a first stage, filter an input security ruleset based on rule matching against the resident security ruleset which yields a first subset of the input security ruleset that does not have a match in the resident security ruleset;

in a second stage, filter the first subset of the input security ruleset based on similar traffic matching, wherein the instructions to filter in the second stage comprise instructions executable by the processor to cause the apparatus to enforce the first subset of the input security ruleset and filter out rules from the first subset of the input security ruleset triggered by at least one of a plurality of cyberattack samples that triggered at least one rule of the resident security ruleset; and update the resident security ruleset with the filtered input security rules from the second stage.

18. The apparatus of claim 17, wherein the instructions to filter in the first stage comprise instructions executable by the processor to cause the apparatus to search a repository that hosts the resident security ruleset for complete matches and then for partial matches with those of the input security ruleset without a complete match.

19. The apparatus of claim 18, wherein the instructions to search the repository for partial matches comprise instructions executable by the processor to cause the apparatus to search for a match with a first rule component having a highest match confidence relative to rule components and then search the repository for a match with a combination of rule components that collectively have a sufficient match confidence.

20. The apparatus of claim 19, wherein the first rule component is a vulnerability identifier and the combination of rule components comprises one of a combination of a rule header component and a rule options component, a combination of multiple rule header components, a combination of multiple rule options components, and a combination of rule metadata and at least one of a rule header component and a rule options component.

\* \* \* \* \*